Figure 3:
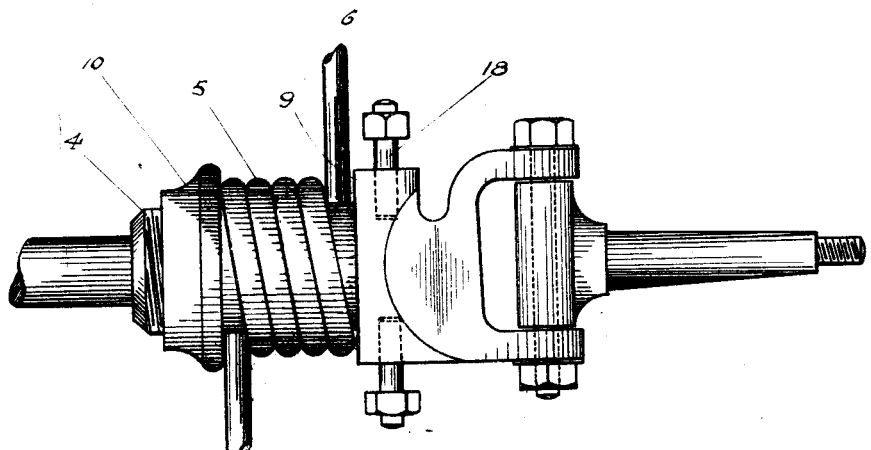

J. F. HAYES.
ROAD VEHICLE.
APPLICATION FILED OCT. 1, 1914.
1,194,625.
Patented Aug. 15, 1916
2 SHEETS—SHEET 1
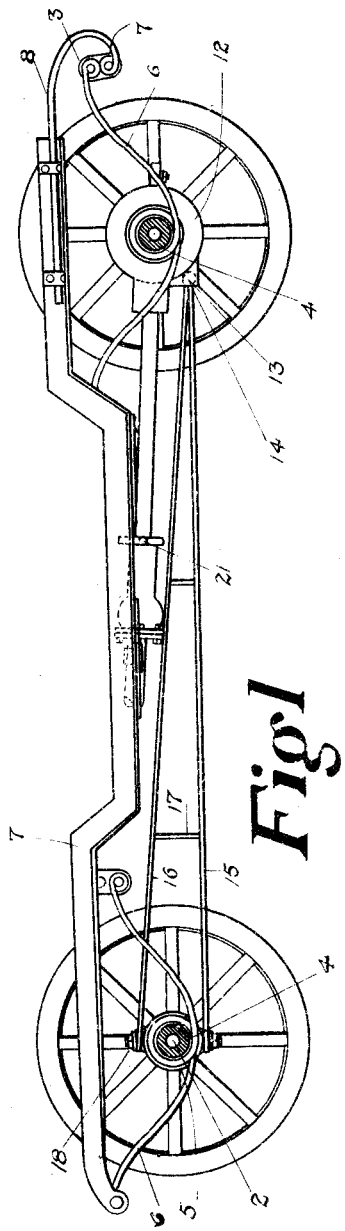
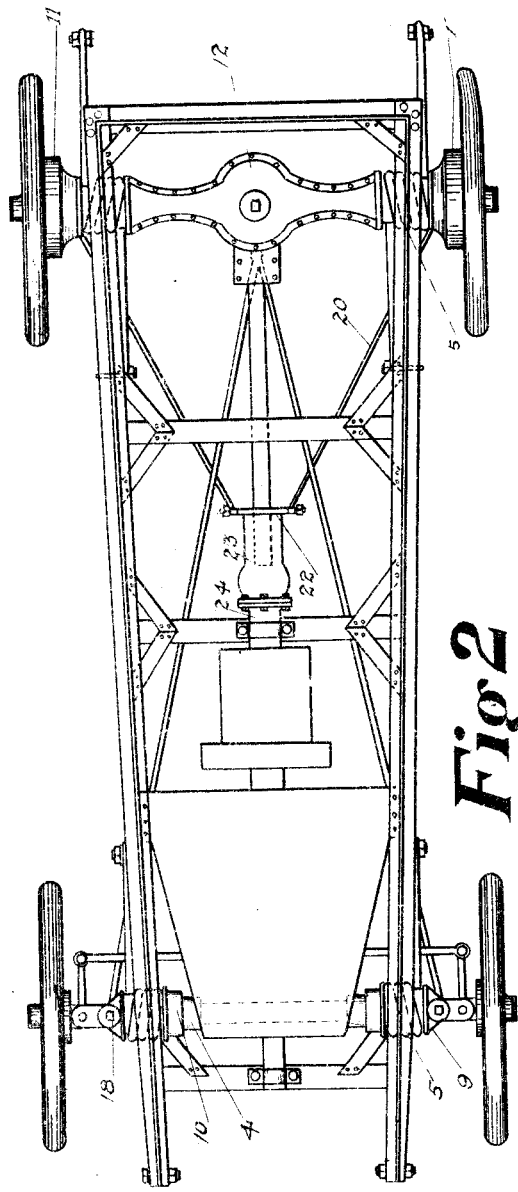
Witnesses:
John Fredrick Hayes Inventor
By
Attorneys

J. F. HAYES.
ROAD VEHICLE.
APPLICATION FILED OCT. 1, 1914.

1,194,625.

Patented Aug. 15, 1916.
2 SHEETS—SHEET 2.

Witnesses:

JOHN FREDRICK HAYES   Inventor

By

Attorneys

UNITED STATES PATENT OFFICE.

JOHN FREDRICK HAYES, OF CONSORT, ALBERTA, CANADA.

ROAD-VEHICLE.

1,194,625.　　　　Specification of Letters Patent.　　Patented Aug. 15, 1916.

Application filed October 1, 1914. Serial No. 864,369.

*To all whom it may concern:*

Be it known that I, JOHN FREDRICK HAYES, a subject of the King of Great Britain, residing at Consort, Province of Alberta, Canada, have invented certain new and useful Improvements in Road-Vehicles; and I do hereby declare that the following is a full, clear, and exact description of the invention, such as will enable others skilled in the art to which it appertains to make and use the same.

The invention to be hereinafter described relates to road vehicles, and more particularly automobiles.

In order to more clearly disclose the construction, operation, and use of the invention, reference should be had to the accompanying drawings forming part of the present application.

Throughout the several figures of the drawings like reference characters designate the same parts.

Figure 4:
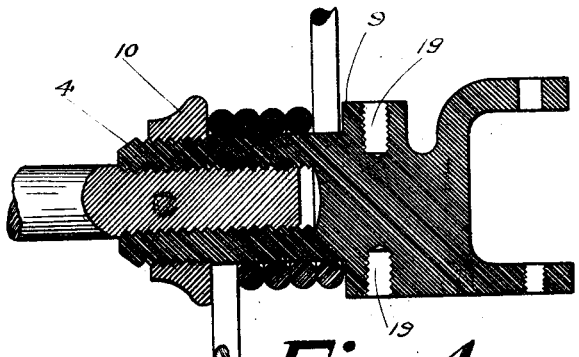

In the drawings: Figure 1 is a side elevation; Fig. 2 is a top plan view; Fig. 3 is an enlarged fragmentary view showing the spring coil in side elevation; and Fig. 4 is a central, vertical, longitudinal, cross section through Fig. 3.

The main objects of the invention are to provide a simple, efficient, economical, durable, and compact vehicle gear, operating on a three point principle, in combination with supporting springs so constructed, arranged, and disposed as to give maximum efficiency with absolutely no hindrance of any kind. One particular feature is the perfect freedom of all parts of the spring.

Referring to the drawings in detail, 1 indicates a suitable chassis forming the usual side or longitudinal beams connected to the usual cross or lateral beams. Front and rear axles 2 and 3 are provided at their opposite ends with sleeves 4, the rear axle sleeves being loose, of course, to permit free rotation of the axle. For the front axle, these sleeves may be formed as a part of the female portion of the steering knuckles, in which the front wheels are mounted—see Figs. 3 and 4. About each sleeve is wound the coil 5 of a strong spring rod 6, one end of which is connected to the side member of the chassis, while the opposite end is suitably secured to a shackle 7. The shackle 7 of the front springs are connected to the chassis, but the shackles of the rear springs are connected to secondary springs 8 adjustably connected to the rear parts of the side members of the chassis. The rear axle, as usual, acts as a transmission shaft to transmit power from the drive shaft of the engine to the rear wheels through the usual and well known driving gears. To prevent undue spreading of the spirals of the coils, the sleeves are provided with shoulders 9 at one end and have their opposite ends threaded to receive retaining rings 40, in the case of the front sleeves, and brake drums 11, which also act as retainers, in the case of the rear sleeves. About the rear axle and its gears, and the coöperating end of the engine or drive shaft, is mounted a gear casing 12 formed of two similar casing sections provided with flanges and adapted to be bolted together about these parts. The ends of the halves are flanged for solidly securing to the sleeves 4 by bolting such flanges to the shoulders 9 of the rear sleeves. The gear casing carries, directly beneath and in front of its longitudinal center, a socket 13 adapted to receive the universal or ball joint 14. This ball forms the single bearing point of two connected and divergent triangular trusses each consisting of two divergent bars 15 and 16 connected in spaced relation by two short cross bars 17.

The outer or separated ends of the bars 15 and 16 are solidly secured to the collars 9 of the front sleeves by means of bolts 18 threaded through the ends thereof and into upper and lower sockets 19 formed in the shoulders 9. One socket is provided in the top side of the shoulder and the other in the under side. The two trusses are similarly connected to the two front sleeves at opposite ends of the front axle. From the shoulder of each of the rear sleeves extends a strong brace rod or beam 20. These beams converge forwardly and inwardly toward the center of the chassis and are provided with perforated or bored inner ends to be slipped over threaded pins 21 projecting from a collar 22 on a guide tube 23 connected by universal joint to a second tube 24 which is solidly clamped to the center of the under part of the chassis. Tube 24 extends from the motor and incloses part of the engine shaft. Tube 23 acts as a continuation of tube 24 but is of somewhat greater diameter to permit play of the engine shaft as the chassis rises or falls relatively to the rear axle. The engine shaft is, of course, provided with a universal or flexible joint within the universal joint which connects tubes 23 and 24, permitting free relative vertical movement between the chassis and rear axle.

From the above, it is evident that the springs are all perfectly free and untrammeled, that there is no binding action on them at any point, and that there are no connections or attachments intermediate of the ends which could interfere with their flexibility and supporting power. It is also evident that all tractive force is applied direct to the chassis and direct to the front axle, and not through the springs. Traction or driving power is applied through the trusses from the casing to the opposite ends of the front axle, on a three point principle; and from the rear sleeves from the braces 20 to the center of the chassis, also on a three point principle.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In combination, a chassis, front and rear axles, a casing carried by the said rear axle, a pair of divergent trusses flexibly connected by a single point to said casing, means for connecting the outer ends of said trusses to the outer ends of the front axle, a pair of brace rods carried by the opposite ends of the said rear axle, means for connecting the said brace rods to the center of said chassis, sleeves on said axles, and supporting springs loosely coiled about said sleeves and having their opposite ends connected, respectively, to the chassis and to shackles carried thereby.

2. In combination, a chassis, front and rear axles, a casing carried by the said rear axle, a pair of divergent trusses flexibly connected at a single point to said casing, means for connecting the outer ends of said trusses to the outer ends of the front axle, a pair of brace rods carried by the opposite ends of the said rear axle and connected to the center of the chassis, means for connecting said brace rods to the center of said chassis, sleeves on said axles, supporting springs loosely coiled about said sleeves and having their opposite ends connected, respectively, to the chassis and to shackles carried thereby, and means for preventing spreading of the coils of said springs.

In witness whereof I have hereunto set my hand in the presence of two witnesses.

JOHN FREDRICK HAYES.

Witnesses:
  Leon G. Humbert,
  Luke Herbert Guilfoyle.